Oct. 18, 1938. J. W. RUND, JR 2,133,905
CORN PICKER GATHERING POINT
Filed March 30, 1937
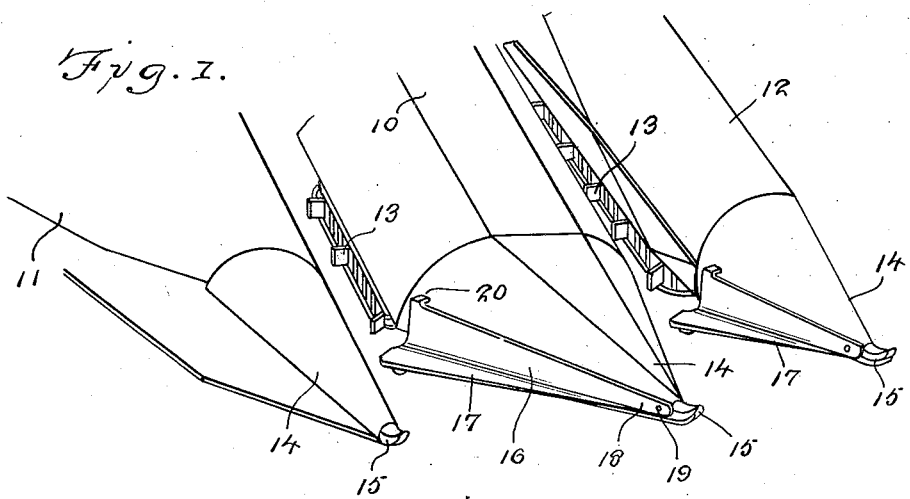
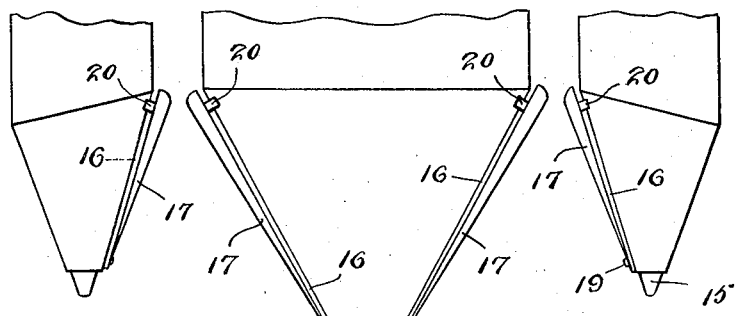
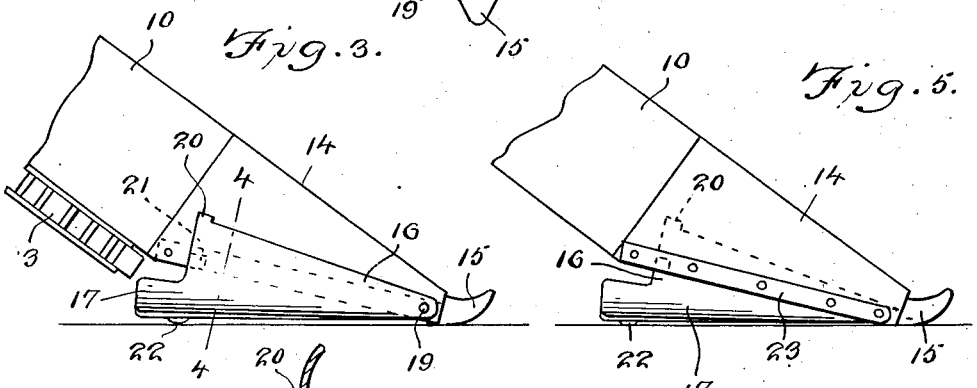
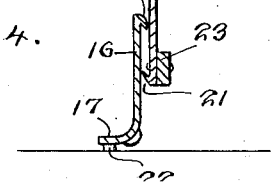
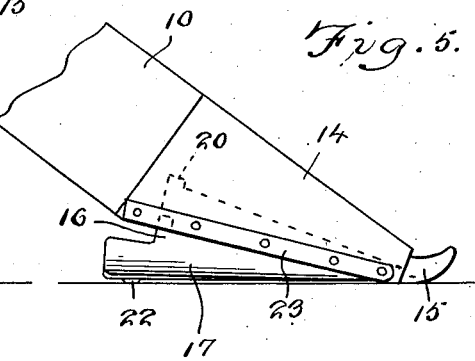
John W. Rund, Jr.
INVENTOR
BY *Victor J. Evans & Co.*
ATTORNEYS Patented Oct. 18, 1938

2,133,905

UNITED STATES PATENT OFFICE 2,133,905

CORN PICKER GATHERING POINT

John W. Rund, Jr., Pesotum, Ill.

Application March 30, 1937, Serial No. 133,884

1 Claim. (Cl. 56—119)

This invention relates to corn picker gathering points and has for an object to provide a floating pickup attachment on the gathering point for lifting fallen ears from the ground and conducting the same to the gathering unit.

A further object is to provide a pickup attachment which is pivoted at the front end to the front end of the conventional gathering point and is weighted at the rear end to closely follow irregularities in the ground and thus most effectively pick up the fallen ears.

A further object is to provide a pickup attachment which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification—

Figure 1 is a fragmentary perspective view of the forward part of a corn harvester and having a pickup attachment constructed in accordance with the invention.

Figure 2 is a plan view of the parts shown in Figure 1.

Figure 3 is a side elevation of one of the pickup attachments in operative position.

Figure 4 is a detail cross sectional view taken on the line 4—4 of Figure 3.

Figure 5 is a side elevation showing the pickup attachment mounted inside of the gathering point.

Referring now to the drawing in which like characters of reference designate similar parts in the various views, 10 designates the double central arm of a conventional corn harvester and between it and the side arms 11 and 12 are the passageways through which the standing corn is guided to the picking mechanism 13. The arms terminate in respective floating gathering points 14 which terminate in ground engaging runners 15.

In carrying out the invention the pickup attachments are secured to the inner sides of the outer gathering point and to both sides of the central gathering point. Each pickup attachment comprises an upstanding back plate 16 and a horizontally disposed bottom plate 17, both plates tapering toward the pointed front end 18 of the attachment. A pivot pin 19 is passed through said front end adjacent the respective runner 15.

A lug 20 projects from the top of the back plate at the rear end thereof and forms a stop which is adapted to engage an abutment 21 projecting from the gathering point and limiting pivotal movement of the pickup attachment. The abutment may be simply a ledge formed on the bottom edge of the gathering point or may be otherwise constructed.

The bottom plate 17, as best shown in Figures 3 and 5, extends rearwardly beyond the back plate and is slightly dished to accurately direct fallen ears to the picking mechanism 13. The bottom plate is also weighted near the rear end by a runner 22 which may be in the nature of a rounded lug or may be otherwise constructed. The weighted rear end of the pickup attachment assures that the attachment will pivot freely and closely follow accurately the contours of irregular surfaces in the ground.

The pickup attachment may be mounted on the outside of its respective gathering point, or, as shown in Figure 5, may be mounted on the inside of the gathering point. When mounting the pickup attachment upon the inside of the gathering point a conventional brace bar 23 need not be disturbed. However, when the pick up attachment is mounted on the outside of the gathering point the brace bar is preferably removed from its conventional position and disposed upon the inside of the gathering point, as shown in Figure 4.

In operation the pickup attachment closely hooks the ground and lifts fallen ears. The fallen ears due to the contour of the bottom plate, will be directed accurately rearwardly to the picking mechanism.

From the above description it is thought that the construction and operation of the invention will be fully understood without further explanation.

What is claimed is:

The combination with a corn harvester gathering point terminating in a runner at the front end, of a pick up attachment comprising an upstanding plate, a bottom plate extending horizontally from the bottom edge of the upstanding plate, both plates tapering to a point at the front end of the pick up attachment, a pivot pin passed through said front end of the pick up attachment and through the gathering point adjacent said runner, a lug projecting from the upstanding plate at the rear end thereof, a ledge on the gathering point against which said lug impinges to limit pivotal movement of the attachment, the bottom plate extending beyond the rear end of the upright plate and being slightly dished to direct fallen ears of corn rearwardly along the gathering point, and a rounded lug on the bottom of the rear end of the bottom plate forming a runner and weighting the rear end of the attachment to permit the attachment conforming to irregularities of the ground.

JOHN W. RUND, Jr.